(12) United States Patent
Combetta

(10) Patent No.: US 7,521,402 B2
(45) Date of Patent: Apr. 21, 2009

(54) LUBRICANT COMPOSITION, FASTENER COATED WITH SAME, AND METHODS FOR MAKING AND USING SAME

(75) Inventor: David William Combetta, Eastpointe, MI (US)

(73) Assignee: ND Industries, Inc., Clawson, MI (US)

( * ) Notice: Subject to any disclaimer, the term of this patent is extended or adjusted under 35 U.S.C. 154(b) by 414 days.

(21) Appl. No.: 11/343,726

(22) Filed: Jan. 31, 2006

(65) Prior Publication Data

US 2007/0111909 A1    May 17, 2007

Related U.S. Application Data

(60) Provisional application No. 60/710,203, filed on Aug. 22, 2005.

(51) Int. Cl.
*C10M 141/12* (2006.01)
*C10M 159/06* (2006.01)
*F16B 2/00* (2006.01)

(52) U.S. Cl. .................. 508/450; 508/451; 508/459; 508/537; 508/551; 508/591; 411/548; 470/209

(58) Field of Classification Search .............. 508/450, 508/451, 459, 537, 591
See application file for complete search history.

(56) References Cited

U.S. PATENT DOCUMENTS

| | | |
|---|---|---|
| 3,950,579 A | 4/1976 | Wallace |
| 4,059,136 A | 11/1977 | Wallace |
| 4,081,012 A | 3/1978 | Wallace |
| 4,262,038 A | 4/1981 | Wallace |
| 4,268,544 A | 5/1981 | Wallace |
| 4,279,943 A | 7/1981 | Wallace |
| 4,285,378 A | 8/1981 | Wallace |
| 4,321,885 A | 3/1982 | Wallace |
| 4,325,985 A | 4/1982 | Wallace |
| 4,371,446 A * | 2/1983 | Kinoshita et al. ........... 508/144 |
| 4,399,166 A | 8/1983 | Wallace |
| 4,420,604 A | 12/1983 | Wallace |
| 4,428,981 A | 1/1984 | Wallace |
| 4,428,982 A | 1/1984 | Wallace |
| 4,501,041 A | 2/1985 | Wallace |
| 4,508,759 A | 4/1985 | Wallace |
| 4,545,712 A | 10/1985 | Wallace |
| 4,686,272 A | 8/1987 | Wallace |
| 4,764,579 A | 8/1988 | Wallace |

(Continued)

OTHER PUBLICATIONS

PCT Notification of Transmittal of International Preliminary Report on Patentability in PCT counterpart, International Application No. PCT/US07/02523, mailed Oct. 8, 2008.

*Primary Examiner*—Ellen M. McAvoy
(74) *Attorney, Agent, or Firm*—Winston & Strawn LLP; Richard P. Gilly

(57) ABSTRACT

A lubricating composition includes about 50 weight percent to about 70 weight percent of a blend including an olefinic resin and a wax. The lubricating composition also includes about 15 weight percent to about 30 weight percent of a fatty acid amide. The lubricating composition further includes about 10 weight percent to about 20 weight percent of a zinc salt of a fatty acid having carboxylate groups each having 8 to 24 carbon atoms.

24 Claims, 1 Drawing Sheet

U.S. PATENT DOCUMENTS

| | | |
|---|---|---|
| 4,847,113 A | 7/1989 | Wallace |
| 4,851,175 A | 7/1989 | Wallace |
| 4,891,244 A | 1/1990 | Wallace |
| 5,000,636 A | 3/1991 | Wallace |
| 5,202,365 A | 4/1993 | Wallace |
| RE34,522 E | 1/1994 | Wallace |
| 5,426,130 A | 6/1995 | Thurber et al. |
| 5,518,768 A | 5/1996 | Wallace et al. |
| 5,607,720 A | 3/1997 | Wallace et al. |
| 5,651,824 A | 7/1997 | Wallace et al. |
| 5,656,325 A | 8/1997 | Wallace |
| 5,672,376 A | 9/1997 | Wallace |
| 5,679,160 A | 10/1997 | Wallace et al. |
| 5,918,727 A | 7/1999 | Wallace et al. |
| 5,928,711 A | 7/1999 | Wallace et al. |
| 5,964,551 A | 10/1999 | Wallace |
| 6,027,568 A | 2/2000 | Wallace et al. |
| 6,063,437 A | 5/2000 | Wallace et al. |
| 6,228,169 B1 | 5/2001 | Wallace |
| 6,270,838 B1 | 8/2001 | Wallace et al. |
| 6,294,507 B1 * | 9/2001 | Dahl .......................... 508/459 |
| 6,322,628 B1 | 11/2001 | Wallace |
| 6,474,919 B2 | 11/2002 | Wallace et al. |
| 6,500,787 B1 * | 12/2002 | Tanaka et al. ............... 508/451 |
| 6,817,816 B2 | 11/2004 | Hill |
| 6,846,779 B1 * | 1/2005 | Hinterwaldner et al. ..... 508/118 |
| 7,138,184 B2 * | 11/2006 | Clerici et al. ............... 428/447 |
| 7,244,696 B2 * | 7/2007 | Patel et al. .................. 508/150 |
| 7,260,889 B2 * | 8/2007 | Hinterwaldner et al. ....... 29/700 |
| 7,360,798 B2 * | 4/2008 | Matsumoto et al. ........... 285/94 |

* cited by examiner

LUBRICANT COMPOSITION, FASTENER COATED WITH SAME, AND METHODS FOR MAKING AND USING SAME

CROSS-REFERENCE TO RELATED APPLICATION(S)

This application claims the benefit of copending U.S. Provisional Patent Application Ser. No. 60/710,203, filed Aug. 22, 2005.

BACKGROUND OF THE INVENTION

1. Field of the Invention

The present invention relates generally to lubricant compositions and fasteners and, more particularly, to lubricant compositions, fasteners coated with the lubricant compositions, and method for making and using lubricant compositions and fasteners coated with such compositions.

2. Description of the Related Art

A relatively large market exists for a category of fasteners known alternatively as thread forming, thread rolling, or self-tapping fasteners. Such fasteners create strong, uniform load carrying internal threads upon installation in untapped nuts or similar members with one or more unthreaded bores. Use of such fasteners is especially prevalent in the automotive industry. Thread forming fasteners commonly are used in the automotive industry, for example, for securing components and equipment.

Different types of self-threading fasteners are available from a variety of sources, such as those carrying the trademarks TAPTITE® and TRILOBULAR™ in connection with a variety of three lobe thread forming fasteners such as screws and bolts. Thread forming fasteners are also described in various patents, including, for example, U.S. Pat. Nos. 3,978,760 and 3,803,889. Generally, a lobular thread forming fastener has a head and a threaded shank. The shank includes a threaded lobular region characterized by an arcuate polygonal, in most instances substantially triangular, pitch surface and cross-sections.

In operation, as the fasteners are driven into an untapped pilot hole of a workpiece, such as an unthreaded nut body or blank, the external threads of the thread forming fastener cut or form complementary female threads into the side wall of a pilot hole in the nut or blank, such as by a swaging operation. The resulting tight engagement between the fastener external threads and the female threads formed thereby in the workpiece is particularly advantageous and inherently provides superior resistance to vibrational loosening when compared to joints that use fasteners having pre-formed threads.

As the fastener is driven into the workpiece, the surface contact area (and hence the frictional force) between the fastener external threads and the pilot hole walls increases continuously. As the surface contact and frictional force increases, the amount of torque required to drive the fastener further into the workpiece increases. This is particularly true where the blank or nut is made of a hard metal or has a substantial thickness. Although the torque required for driving a threaded lobular fastener into an unthreaded workpiece can be significantly less than that encountered with a self-threading round-bodied thread rolling fastener, a relatively large amount of torque is still necessary to overcome the frictional forces.

The high frictional forces and large driving torque requirement inherent to a thread forming fastener has various disadvantages. For example, the high frictional forces may cause deformation of the female thread formed in the workpiece and, as a consequence, an interface mismatch may result between the fastener external thread and the workpiece female thread. These mismatches and surface-to-surface (e.g., metal-to-metal) galling effects between the fastener and the workpiece may result in fluctuating torque. Inconsistency in the required drive torque may lead to over-tightening or under-tightening of the fasteners within the workpieces. Imprecise tightening procedures can adversely affect manufacturing efficiency and the performance and appearance of the finished joint. The high frictional forces and galling effect can also lead to stripping of the fastener external threads and/or the workpiece female threads, potentially adversely impacting the clamping load of the fastener.

The vast majority of self-threading screws are applied in assemblies using automated power drivers. The clutch or related mechanisms of these power drivers are designed to disengage at precisely the same torque value each time. If the threads of the thread forming fastener or the threads formed thereby in an unthreaded nut or blank are deformed for the reasons set forth above, the driver may cease the application of force to the fastener prior to it being completely installed.

Previously, a number of lubricants have been used in connection with thread forming fasteners in an attempt to overcome some of these disadvantages. However, these lubricants have presented substantial drawbacks. For example, most of these lubricants have not provided a sufficient reduction in peak installation torque to meet or exceed current industry specifications. Additionally, although some of these lubricants have provided a significant reduction in peak installation torque, they have not exhibited the ability to significantly reduce such torque values with the necessary high degree of consistency.

SUMMARY OF THE INVENTION

It is, therefore, one object of the present invention to provide a lubricating composition applicable to fasteners, especially, but not necessarily self-threading fasteners, for reducing frictional forces and torque requirements associated with driving the fasteners into an unthreaded workpiece.

It is another object of the present invention to provide a lubricating composition that, when applied to a fastener, meets or exceeds automotive fastener specifications for reducing peak installation torque values on a highly consistent basis.

It is yet another object of the invention to provide a coated fastener that reduces frictional forces and torque requirements and meets or exceeds existing automotive fastener specifications such as Ford Motor Company specification WSS-M21P27-A4, General Motors GM9936167, and Daimler-Chrysler MS-9775.

It is still another object of the present invention to provide methods for using and making a lubricating composition and coated fastener that do not require the use of solvents or create volatile organic compound emission.

To achieve one or more of the foregoing objects, the present invention is a lubricating composition comprising about 50 weight percent to about 70 weight percent of a blend comprising an olefinic resin and a wax, about 15 weight percent to about 30 weight percent of a fatty acid amide, and about 10 weight percent to about 20 weight percent of a zinc salt of a fatty acid having carboxylate groups each having 8 to 24 carbon atoms.

Also, the present invention is a coated fastener including a fastener body having a surface. The coated fastener also includes a coating applied on at least a portion of the surface. The coating includes a lubricating composition having about 50 weight percent to about 70 weight percent of a blend comprising an olefinic resin and a wax, about 15 weight percent to about 30 weight percent of a fatty acid amide, and about 10 weight percent to about 20 weight percent of a zinc salt of a fatty acid having carboxylate groups each having 8 to 24 carbon atoms.

Further, the present invention is a method of making a coated fastener including the steps of providing a fastener having a fastener body with a surface. The method also includes the steps of coating at least a portion of the surface with a lubricating composition having about 50 weight percent to about 70 weight percent of a blend comprising an olefinic resin and a wax, about 15 weight percent to about 30 weight percent of a fatty acid amide, and about 10 weight percent to about 20 weight percent of a zinc salt of a fatty acid having carboxylate groups each having 8 to 24 carbon atoms.

Additionally, the present invention is a method for mating a fastener with a workpiece having a pilot hole defined by an inner wall portion. The method includes the steps of providing a fastener having a longitudinal axis, a head, and a shank extending from the head, the shank having a threaded region comprising an external helical thread. The method also includes the steps of preconditioning at least one of the threaded region and the inner wall portion to include a lubricating composition having about 50 weight percent to about 70 weight percent of a blend comprising an olefinic resin and a wax, about 15 weight percent to about 30 weight percent of a fatty acid amide, and about 10 weight percent to about 20 weight percent of a zinc salt of a fatty acid having carboxylate groups each having 8 to 24 carbon atoms. The method further includes the steps of inserting one end of the shank into the pilot hole and rotating the head about the longitudinal axis and longitudinally advancing the fastener forward to drive a portion of the shank into the pilot hole and forming a thread in a portion thereof.

One advantage of the present invention is that a lubricating composition for fasteners is provided for reducing frictional forces and torque requirements associated with driving the fasteners into an unthreaded workpiece. Another advantage of the present invention is that the lubricating composition, when applied to a fastener, meets or exceeds automotive fastener specifications for reducing peak installation torque values on a highly consistent basis. Yet another advantage of the present invention is that a coated fastener is provided that reduces frictional forces and torque requirements and meets or exceeds existing automotive fastener specifications. Still another advantage of the present invention is that methods for using and making a lubricating composition and coated fastener do not require the use of solvents or create volatile organic compound emission.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
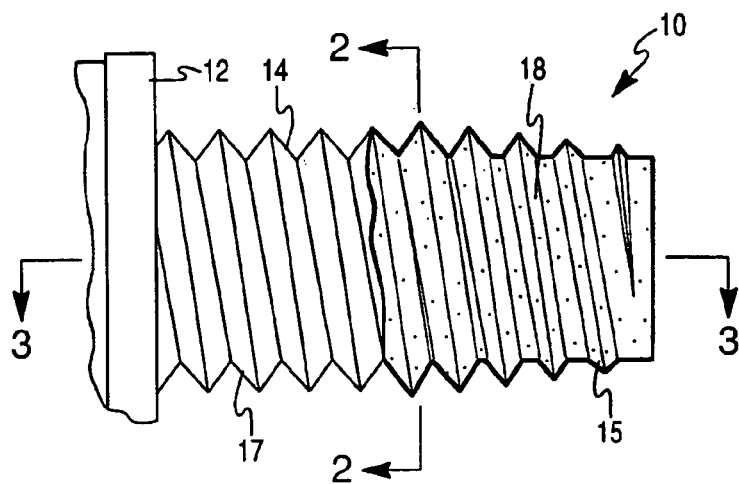
FIG. 1 is a side elevational view of a coated self-threading fastener, according to the present invention.
Figure 2:
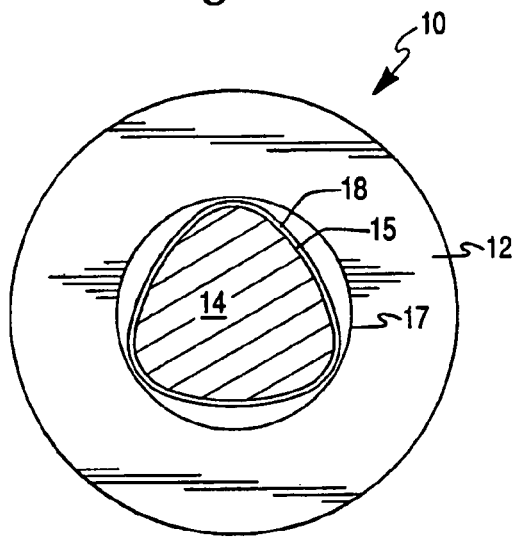
FIG. 2 is a sectional view taken along line 2-2 of FIG. 1.
Figure 3:
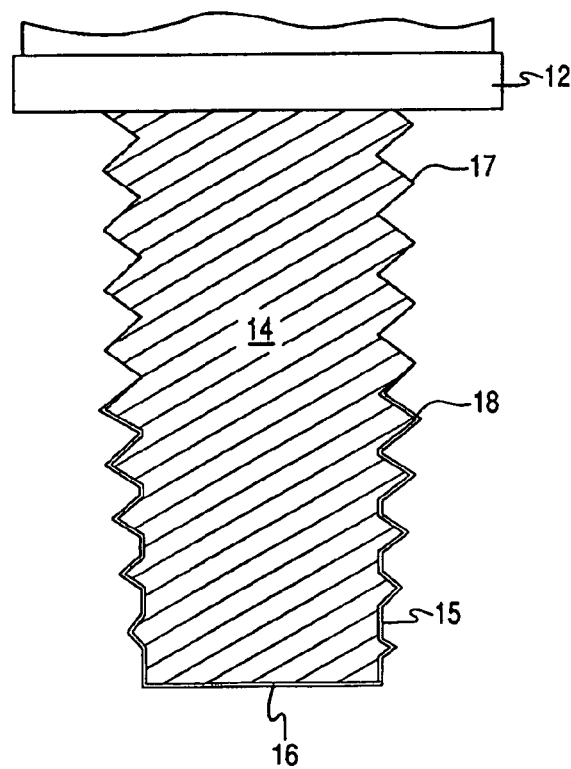
FIG. 3 is a sectional view taken along line 3-3 of FIG. 1.

Referring to the drawings and in particular FIGS. 1 through 3, one embodiment of a coated fastener 10, according to the present invention, is shown. The coated fastener 10 is of a typical trilobular self-threading type. The coated fastener 10 includes a head 12, threaded shank 14, and tip 16. The coated fastener 10 is but one example of a type of fastener that can derive benefit from lubricating compositions, according to the present invention to be described, and is intended to be non-limiting. As illustrated, the threaded shank 14 has a portion 15 with an out-of-round cross-sectional shape and another portion 17 with a generally circular cross-sectional shape. The coated fastener 10 includes a coating 18 of a lubricating composition, according to the present invention, covering a portion of the shank 14. It should be appreciated that, although the coating 18 illustrated extends from and covers the tip 16 and approximately six threads of the shank 14, these illustrations are only for exemplary purposes and that the coating 18 may be applied to more or less threads and/or in a location on the shank other than those illustrated in the figures. It should also be appreciated that the coated fastener 10 may be of a thread forming type having either a shank with a circular cross-section along the entire length thereof or one or more out-of-round cross-sections along the length of the shank.

The coating 18 is of a lubricating composition, according to the present invention. One embodiment of the lubricating composition is a solid at room temperature (about 70° F. to 72° F.), possesses a melt temperature higher than the intended application temperature (i.e., the expected environmental temperature in which the composition will be used in practice once applied to a fastener or like substrate), and is designed, upon melt application to a metallic workpiece (e.g., fastener) and subsequent solidification, to leave a homogeneous, continuous lubricant film on the metallic workpiece that is dry to the touch and ready for immediate use. The melt temperature of the lubricating composition, preferably yet optionally, is in a range of about 130° C. to about 160° C., although different melt temperatures may be desirable or warranted for different intended applications. The lubricating composition is also preferably free of volatile organic compounds (VOCs). In one embodiment, the lubricating composition comprises an olefinic resin/wax blend, a fatty acid amide, and a zinc salt of a fatty acid.

The olefinic resin/wax blend comprises at least one olefinic resin component and at least one wax component, which optionally are homogeneously mixed with one another. The primary functions of the blend are to promote a film-forming property at room temperature and contribute to the overall low lubricity of the composition. To perform these functions, the blend preferably constitutes from about 50 weight percent to about 70 weight percent of the lubricating composition. Reducing the blend content below about 50 weight percent can adversely affect the film-forming ability of the lubricating composition. On the other hand, including more than about 70 weight percent blend in the lubricating composition may adversely affect the lubricity of the composition.

The lubricating composition may include a single wax, or a combination of a plurality of waxes. In one embodiment, a petroleum wax is preferable. Exemplary petroleum waxes include hydrogenated microcrystalline waxes, paraffin waxes, and a combination thereof. Paraffin wax is generally understood in the art to mean waxes obtained from a crude oil distillation process from the distillate by separation and purification, and usually comprises saturated hydrocarbon compounds having straight chain hydrocarbons at its main components. Microcrystalline wax is generally understood in the art to mean waxes obtained from the residual oil after the distillation of crude oil under pressure, and generally contains saturated (hydrogenated) hydrocarbons in microcrystalline form, with branched and cyclic hydrocarbons constituting the main components.

The wax by itself does not possess superior adhesive properties for adhering to a metal surface. Accordingly, the olefinic resin is provided for promoting adhesion. Weight ratio of olefinic resin to wax in the blend may exist in the range, for example and not necessarily by limitation, from about 40:60 to about 50:50.

The olefinic resin is compatible with the wax component(s) of the blend and preferably forms a homogeneous, single-phase blend with the wax component(s). The olefinic resin preferably comprises a resinous polymeric reaction product of a composition comprising first and second olefinic hydrocarbon compounds, and is more preferably but not necessarily a random polymer, especially a terpolymer. The olefinic hydrocarbons may include at least one or more members selected from the group of oc-olefin, a diene, and a cyclic non-aromatic olefin. The reaction composition is preferably yet not necessarily free of aromatic compounds. The a-olefin is optimally an a-olefin other than ethylene and propylene, and may be straight chain (e.g., 1-hexene) or branched (e.g., 2-methyl-2-butene). The diene is preferably yet not necessarily a straight-chain aliphatic compound, such as 1,3-pentadiene. The non-aromatic cyclic olefin is optionally a diene, such as, for example, cyclopentadiene and/or 3a,4,7,7a-tetrahydro-4,7-methanoindene (also known as dicyclopentadiene ($CIOH_{12}$)).

The blend preferably has a melt temperature in a range of about 66.7° C. (152° F.) to about 73.9° C. (165° F.), more preferably about 68° C. (155° F.). The blend is also preferably water-free and filler-free. An exemplary olefin resin/wax blend satisfying the above preferences is available under the brand Arkochem Proaid RW, manufactured by Akrochem Corporation, of (city), (State or Country).

The fatty acid amide is preferably an aliphatic amide having the formula $R^1CONHR^2$, wherein CO is a carbonyl group, $R^1$ is an adjacent moiety selected from an alkyl (saturated) or alkylene (unsaturated) group containing 7 to 23 carbon atoms, preferably 14 to 18 carbon atoms, and wherein $R^2$ is an unsaturated or saturated hydrocarbon group or hydrogen. In one embodiment, the fatty acid amide is a primary unsaturated amide, in which $R^1$ comprises an unsaturated group and $R^2$ is hydrogen. Examples of fatty acid amides include oleamide, erucamide, and stearamide, each of which is available from Struktol Company of America, (City, State or Country).

The fatty acid component may optionally include an aliphatic bis-amide having the formula $R^3CONHCH_n NH-COR^4$, wherein $R^3$ and $R^4$ each are an alkyl (saturated) or alkylene (unsaturated) group containing 7 to 23 carbon atoms, preferably 14 to 18 carbon atoms, and n is 1 to 4. An example of an aliphatic bis-amide is N,N'-bis-ethylene stearamide. An exemplary fatty acid amide is oleamide ($CH_3$) ($CH_2$)CH=CH($CH_2$)$_7$C(O)$NH_2$, available under designation STRUKTOL TR 121 from Struktol Company of America, (city), (State or Country).

The fatty acid amide functions primarily as a slip agent, and preferably has a melting point in a range of about 70° C. to about 76° C. The fatty acid amide preferably constitutes about 15 weight percent to about 30 weight percent of the lubricating composition. The fatty acid amide functions primarily as a slip agent, although it is believed that the fatty acid amide further contributes to the adhesive properties of the composition. If the content of the fatty acid amide is less than about 15 weight percent, the lubricant tends to become too soft and tends too flow easily. On the other hand, if the content of the fatty acid amide is greater than about 30 weight percent, the lubricant becomes too hard and difficult to handle, and its lubricity is reduced.

The zinc salt of a fatty acid includes carboxylate groups that may be saturated or unsaturated. The carboxylate groups are preferably non-aromatic. Examples of fatty acids that may be used with the zinc salt include stearic acid, oleic acid, lauric acid, octoic acid, myristic acid, palmitic acid, ricinoleic acid, hydroxystearic acid, and dihydroxystearic acid and mixtures thereof. A preferred zinc salt is zinc stearate.

In the lubricating composition of the present invention, it is believed that the zinc salts contribute to achieving a composition melting temperature in the range of about 130° C. to about 160° C. The zinc salts are also believed to function as a compatibilizer between the wax/resin blend and the fatty acid amide, improving the homogeneity of the composition. To perform these functions, the zinc salt fatty acid preferably constitutes from about 10 weight percent to about 20 weight percent of the lubricating composition.

A method for making a lubricating composition, according to the present invention, is disclosed. It should be appreciated that the lubricating compositions of the present invention are not necessarily limited to compositions made by this exemplary method.

The olefin resin/wax blend, fatty acid amide, and zinc salt of a fatty acid may be combined together in any sequence. In one embodiment, the olefin resin/wax blend and the zinc salt components are first mixed together and heated above the combined melt temperature to provide a liquid. The liquid may be continuously or periodically agitated, such as with a propeller blade. Either or both of the components may be metered into the mixture or added in equal or unequal portions. After the olefin resin/wax blend and the zinc salt components have been blended, preferably to homogeneity, the fatty acid amide is added in whole or in portions. The mixture is preferably maintained under heat during this step, optionally with continuous mixing to achieve homogeneity. When the mixture is melted and uniform, it may be poured, such as into ingots, and cooled to room temperature.

The method for making the lubricating composition is preferably conducted in the substantial or complete absence of solvents. In one embodiment, the lubricating composition is applied and adheres to a portion of a metal fastener as a fastener surface finish. The fastener may be, for example, dipped or flow coated in the melted lubricating composition or a spray or stream of the lubricating composition could be directed to the desired portion of the fastener. Dipping preferably lasts for no more than a few seconds to optimize the production rate. In one embodiment, approximately 5 to 10 threads are coated from the tip of the fastener, although it should be understood that in other embodiments, more or fewer threads could be coated either from the top or spaced from the tip of the fastener. It should be appreciated that these methods for applying a lubricating composition to a fastener are exemplary and not necessarily limiting. It should also be appreciated that the lubricating compositions (and fasteners) of the present invention are not necessarily limited to compositions applied (and fasteners having compositions applied) by these exemplary methods.

In one embodiment of the present invention, the lubricating composition has a lubricity sufficient to produce an average maximum thread forming torque performance meeting or exceeding an automotive industry standard, for example, Ford Motor Company Specification Number WSS-M2 1P27-A4, set forth in Table 1. According to an embodiment of this industry standard, a Tap-Tite 2000° self-threading fastener is coated with a lubricating composition from its point to a distance of 5 to 10 threads, preferably 8 to 10 threads. No coating is present on the drive or bearing surfaces of the fastener. The fastener is driven into a test plate to form a mating thread until a minimum of one pitch of the screw, excluding the tapered lead threads, extends beyond the plate. The axial load to ensure commencement of the thread forming process does not exceed 20N. The test plate is made of low carbon rolled steel having a hardness of 115 to 150 HV30.

TABLE 1

(FORD SPECIFICATION)

| Fastener size | Plate thickness (mm) | Hole size (mm, +0.05 mm) | Maximum thread forming torque (N · m) | Maximum thread forming torque (in · lb) |
|---|---|---|---|---|
| M-6 | 4.9-5.2 | 5.5 | 6 | 53.1 |
| M-8 | 6.4-6.8 | 7.4 | 10 | 88.5 |
| M-10 | 8.0-8.4 | 9.3 | 20 | 177 |
| M-12 | 10.4-10.8 | 11.2 | 25 | 221.25 |
| 7/16 | 10.0-10.5 | 10.6 | 25 | 221.25 |

In another embodiment, the lubricating composition is capable of exceeding the Ford specifications set forth in Table 1, and satisfies one or both of the following specifications of Table 2:

TABLE 2

| Fastener size | Plate thickness (mm) | Hole size (mm, +0.05 mm) | Maximum thread forming torque (N · m) | Maximum thread forming torque (in · lb) |
|---|---|---|---|---|
| M-10 | 8.0-8.4 | 9.3 | 15 | 132.75 |
| M-12 | 10.4-10.8 | 11.2 | 20 | 177 |

In yet another embodiment of the present invention, the lubricating composition is capable of meeting or exceeding one or more, and preferably all, of the specifications set forth in Table 3.

TABLE 3

| Fastener size | Plate thickness (mm) | Hole size (mm, +0.05 mm) | Maximum thread forming torque (N · m) | Maximum thread forming torque (in · lb) |
|---|---|---|---|---|
| M-6 | 4.9-5.2 | 5.5 | 3 | 26.55 |
| M-8 | 6.4-6.8 | 7.4 | 7 | 61.95 |
| M-10 | 8.0-8.4 | 9.3 | 12 | 106.2 |
| M-12 | 10.4-10.8 | 11. | 15 | 132.75 |

In still another embodiment of the present invention, the lubricating composition is capable of meeting or exceeding one or more of the specifications set forth in Tables 1-3 and one or both of the specifications General Motors GM9986167 and Daimler Chrysler MS-9775.

EXAMPLES

The following examples serve to explain and elucidate the principles and practice of the present invention further. These examples are merely illustrative, and not exhaustive as to the scope of the present invention.

A lubricating composition of the examples comprised 65 weight percent Akrochem PROAID RW resin/wax blend, 15 weight percent zinc stearate, and 20 weight percent STRUKTOL TR 121 cis-oleamide, and was prepared as subsequently described. 40 pounds of PROAID RW resin/wax blend was added to a 5-gallon steel vessel already containing 15 pounds of zinc stearate. The vessel was heated using a drum blanket to a temperature of 160° C. to melt the contents. An electric mixer with a propeller-type blade was then activated to mix the PROAID RW and zinc stearate. The remaining 25 pounds of the PROAID RW were then added to the steel vessel and homogeneously mixed. The steel vessel was then reheated with the drum blanket to 150° C. to 160° C. to achieve liquid state. Next, 20 pounds of STRUKTOL TR 121 were added and mixed to homogeneity. The steel vessel was again reheated using the drum blanket to 150° C. to 160° C., as necessary, to achieve liquid state. When the mixture was both melted and homogeneous, it was poured as a hot liquid into preformed cardboard ingots and cooled to room temperature to provide the lubricating composition.

The lubricating composition was heated to 130° C. in an oven for application to Tap-Tite 2000® self-threading fastener. Subsequent to liquefying the lubricating composition, the Tap-Tite 2000® self-threading fastener was coated with a lubricating composition from its point to a distance of 5 to 10 threads along the shank thereof. No coating was present on the drive or bearing surfaces of the fastener.

In each of the tests reported below, the fastener was driven into a test plate to form a mating thread until a minimum of one pitch of the screw, excluding the tapered lead threads, extends beyond the plate. A DC-motor nut runner operating at 30 rpm was used for driving. The axial load to ensure commencement of the thread forming process did not exceed 20N. The test plate was made of low carbon rolled steel having a hardness of 115 to 150 HV30.

Torque was monitored and measured with a transducer and RS Technologies LabMaster Torque Monitor equipment. Peak installation torque was recorded.

Example 1

A size M-12 Tap-Tite 2000 self-threading fastener coated with the lubricating composition was driven into low carbon rolled steel test plate having a thickness of 10.4 to 10.8 mm and a hole size of 11.2 mm. This procedure was repeated 10 times, with the results reported in Table 4 below:

TABLE 4

(M-12 Fastener)

| Trial # | Maximum thread forming torque (N · m) | Maximum thread forming torque (in · lbs) |
|---|---|---|
| 1 | 16.1 | 142.49 |
| 2 | 14.2 | 125.67 |
| 3 | 15.3 | 135.41 |
| 4 | 15.1 | 133.64 |
| 5 | 13.7 | 121.25 |
| 6 | 16.1 | 142.49 |
| 7 | 13.4 | 118.59 |
| 8 | 16.6 | 146.91 |
| 9 | 16.1 | 142.49 |
| 10 | 12.3 | 108.86 |
| Average | 14.89 | 131.78 |
| Standard Deviation | 1.43 | 12.64 |

The maximum required thread forming torque for the first set of examples was 14.89 N·m, which was less than 60% of the maximum torque permitted under the Ford specification standard of 25 N·m (see Table 1) and within the preferred ranges of Tables 2 and 3.

Example 2

The procedures set forth above were repeated for M-6, M8, and M-10 Tap-Tite 2000 self-threading fasteners. The fasteners were driven into low carbon rolled steel test plates each having a respective thickness and hole size set forth in Table I and consistent with the Ford specification. The tests were repeated 30 times, and the results are reported below in Table 5.

TABLE 5

Maximum thread forming torque (N · m)

| Trial # | M-6 | M-8 | M-10 |
|---|---|---|---|
| 1 | 2.8 | 5.7 | 10.4 |
| 2 | 2.5 | 5.1 | 10.9 |
| 3 | 2.8 | 5.1 | 11.1 |
| 4 | 2.7 | 5.4 | 11.2 |
| 5 | 2.9 | 5.6 | 10.4 |
| 6 | 2.9 | 6.2 | 11.2 |
| 7 | 2.4 | 5.4 | 10.4 |
| 8 | 2.9 | 5.2 | 10.7 |
| 9 | 2.7 | 5.2 | 11.7 |
| 10 | 2.9 | 5.1 | 10.9 |
| 11 | 2.6 | 5.5 | 10.4 |
| 12 | 3.7 | 5.1 | 10.4 |
| 13 | 3 | 5.8 | 10.7 |
| 14 | 2.5 | 5.6 | 10.1 |
| 15 | 2.7 | 5.6 | 10.9 |
| 16 | 2.6 | 5.4 | 10.5 |
| 17 | 2.7 | 5.6 | 10.4 |
| 18 | 2.5 | 5.5 | 10.2 |
| 19 | 3 | 5.5 | 10.7 |
| 20 | 2.6 | 5.4 | 11.0 |
| 21 | 2.6 | 5.5 | 10.7 |
| 22 | 2.7 | 5.6 | 10.3 |
| 23 | 2.7 | 5.0 | 10.1 |
| 24 | 2.3 | 6.2 | 11.3 |
| 25 | 2.8 | 5.5 | 10.8 |
| 26 | 3.1 | 5.6 | 11.0 |
| 27 | 2.9 | 6.1 | 10.5 |
| 28 | 2.4 | 5.6 | 10.7 |
| 29 | 2.7 | 5.5 | 10.4 |
| 30 | 2.7 | 5.4 | 10.5 |
| Average | 2.743 | 5.00 | 10.683 |
| Standard | 0.264 | 0.303 | 0.381 |

The average maximum thread forming torque for the M-6, M-8, and M-10 fasteners were 2.743, 5.00, and 10.683 N·m, respectively. These values far exceeded the Ford specification, requiring only about 46%, 50%, and 53% of the maximum torques of 6, 10, and 20 N·m, respectively, allowed under the Ford specification standards.

Example 3

TAPTITE 2000 ® M12-1.75×43 mm TORX® Pan Head, CORFLEX®-I thread forming fasteners with a mechanical zinc finish per Ford specification S437M were tested in weld nuts (Ford Part No. N807995) of less than one screw diameter length and engagement. The weld nuts were steel, having a hardness of Rb 94 plain finish, a hole internal diameter of 11.23 millimeters, a thickness of 11.88 millimeters, and engagement of 9.1 millimeters. All the self-threading fasteners were from the same manufacturing lot and material and heat-treated in the same batch. Twenty of these self-threading fasteners had a lubricating composition of the present invention applied to approximately five threads of each of the fastener shanks measured from the tip of each fastener by dip-coating them in the composition. The lubricating composition was dried to the touch at the time of the test. All of the coated fasteners were driven at 270 rpm and thread forming torque was recorded. Torque and angle were sensed by an inline R.S. Technologies 200 Nm transducer. The recorded data for all twenty coated fasteners is reproduced below in Table 6. As a control, three tests were run using the same fasteners as used in the test without the lubricating composition of the present invention applied thereto. The torque performance of all three controlled test was consistent.

TABLE 6

| Trial No. | Thread Forming Torque (Nm) |
|---|---|
| 1 | 14.98 |
| 2 | 13.88 |
| 3 | 15.12 |
| 4 | 13.06 |
| 5 | 13.61 |
| 6 | 14.02 |
| 7 | 14.71 |
| 8 | 16.08 |
| 9 | 14.57 |
| 10 | 13.20 |
| 11 | 14.71 |
| 12 | 14.57 |
| 13 | 14.30 |
| 14 | 13.75 |
| 15 | 12.23 |
| 16 | 15.12 |
| 17 | 15.12 |
| 18 | 13.75 |
| 19 | 14.85 |
| 20 | 13.75 |
| Average | 14.27 |
| Max | 16.08 |
| Min | 12.23 |
| Sigma | 0.891 |
| Avg + 3 | 16.94 |
| Avg − 3 | 11.60 |
| Range − Nm | 5.34 |
| As % of Avg | 37% |
| Sigma − Avg | .0062 |

All of the fasteners coated with the lubricating composition of the present invention performed well with no visible galling or breakdown of the forming threads. All torque values met and far exceeded the requirements for reduced installation torque for the fasteners in question under the aforementioned Ford specification of S437M. In addition to this, the twenty tests exhibited a sigma of only 0.891 Nm, demonstrating a very high level of consistency in the performance of the lubricating composition of the present invention. At the same time the lubricating composition of the present invention was tested, nine other lubricating compositions were tested on the same parts in the same manner. None of these coatings exhibited a consistency of performance in terms of torque reduction as favorable as those of the present invention. The sigmas of the other compositions ranged from 1.151 to 2.396. As such, the performance of the lubricating composition of the present invention was anywhere between 22.69 to 62.81 percent more consistent than those of third parties.

Accordingly, the lubricating compositions of the present invention exhibit benefits in terms of a reduction of required peak installation torque when applied to fasteners. The lubricating compositions of the present invention have demonstrated particular benefits in terms of a very consistent reduction of installation torque when applied to threads of thread forming fasteners such as screws and bolts.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A lubricating composition comprising:
   (a) about 50 weight percent to about 70 weight percent of a blend comprising an olefinic resin and a wax;
   (b) about 15 weight percent to about 30 weight percent of a fatty acid amide; and
   (c) about 10 weight percent to about 20 weight percent of a zinc salt of a fatty acid having carboxylate groups each having 8 to 24 carbon atoms.

2. A lubricating composition as set forth in claim 1 wherein said olefinic resin comprises a polymeric reaction product of a composition comprising first and second olefinic hydrocarbon compounds.

3. A lubricating composition as set forth in claim 1 wherein said olefinic resin comprises a reaction product of a composition comprising at least one a-olefin other than ethylene and propylene, a diene, and a cyclic olefin.

4. A lubricating composition as set forth in claim 1 wherein said olefinic resin comprises a reaction product of a composition comprising 1-hexene, cyclopentadiene, 2-methyl-2-butene, 1,3-pentadiene, cyclopentene, and 3a,4,7,7a-tetrahydro-4,7-methanoindene (dicyclopentadiene).

5. A lubricating composition as set forth in claim 1 wherein said wax comprises a petroleum wax.

6. A lubricating composition as set forth in claim 1 wherein said wax comprises a hydrogenated microcrystalline wax.

7. A lubricating composition as set forth in claim 1 wherein said wax comprises a paraffin wax.

8. A lubricating composition as set forth in claim 1 wherein said wax comprises a hydrogenated microcrystalline wax and a paraffin wax.

9. A lubricating composition as set forth in claim 1 wherein said blend has a melting point in a range of about 66.7° C. to about 73.9° C.

10. A lubricating composition as set forth in claim 1 wherein said fatty acid amide comprises a carbonyl group and an adjacent moiety selected from a saturated and unsaturated alkyl group having 7 to 23 carbon atoms.

11. A lubricating composition as set forth in claim 10 wherein said adjacent moiety comprises an unsaturated alkyl group.

12. A lubricating composition as set forth in claim 1 wherein said fatty acid amide comprises an unsaturated primary amide.

13. A lubricating composition as set forth in claim 1 wherein said fatty acid amide comprises oleamide.

14. A lubricating composition as set forth in claim 1 wherein said carboxylate groups are saturated.

15. A lubricating composition as set forth in claim 1 wherein said carboxylate groups are aliphatic carboxylates.

16. A lubricating composition as set forth in claim 1 wherein said fatty acid comprises a component selected from stearic, oleic, lauric, octoic, myristic, palmitic, ricinoleic, hydroxystearic, and dihydroxystearic acid.

17. A lubricating composition as set forth in claim 1 wherein said amide comprises oleamide, and wherein said zinc salt of a fatty acid comprises zinc stearate.

18. A lubricating composition as set forth in claim 17 wherein said olefinic resin comprises a reaction product of a composition comprising 1-hexene, cyclopentadiene, 2-methyl-2-butene, 1,3-pentadiene, cyclopentene, and dicyclopentadiene, and wherein said wax comprises a member selected from at least one of a hydrogenated microcrystalline wax, a paraffin wax, and a combination comprising hydrogenated microcrystalline and paraffin waxes.

19. A lubricating composition as set forth in claim 1 wherein said lubricating composition has a melt applicable to and subsequently solidifiable on a metallic workpiece to leave a homogeneous, continuous lubricant film on a metallic workpiece.

20. A lubricating composition as set forth in claim 1 wherein said lubricating composition has a melting point in a range of about 130° C. to about 160° C.

21. A lubricating composition as set forth in claim 1 wherein said lubricating composition is free of volatile organic compounds.

22. A solid coated fastener comprising:
   a fastener body having a surface; and
   a solid coating on at least a portion of said surface, said solid coating comprising a lubricating composition comprising about 50 weight percent to about 70 weight percent of a blend comprising an olefinic resin and a wax, about 15 weight percent to about 30 weight percent of a fatty acid amide, and about 10 weight percent to about 20 weight percent of a zinc salt of a fatty acid having carboxylate groups each having 8 to 24 carbon atoms.

23. A method of making a solid coated fastener, said method comprising the steps of:
   providing a fastener having a fastener body with a surface; and
   coating at least a portion of the surface with a lubricating composition having about 50 weight percent to about 70 weight percent of a blend comprising an olefinic resin and a wax, about 15 weight percent to about 30 weight percent of a fatty acid amide, and about 10 weight percent to about 20 weight percent of a zinc salt of a fatty acid having carboxylate groups each having 8 to 24 carbon atoms to form the solid coated fastener.

24. A method for mating a fastener with a workpiece having a pilot hole defined by an inner wall portion, said method comprising the steps of:
   providing a fastener having a longitudinal axis, a head and a shank extending from the head, the shank having a threaded region comprising an external helical thread;
   preconditioning at least one of the threaded region and the inner wall portion to include a solid lubricating composition thereon having about 50 weight percent to about 70 weight percent of a blend comprising an olefinic resin and a wax, about 15 weight percent to about 30 weight percent of a fatty acid amide, and about 10 weight percent to about 20 weight percent of a zinc salt of a fatty acid having carboxylate groups each having 8 to 24 carbon atoms;
   inserting one end of the shank into the pilot hole; and
   rotating the head about the longitudinal axis and longitudinally advancing the fastener forward to drive a portion of the shank into the pilot hole and forming a thread in a portion thereof.

* * * * *